April 28, 1953     W. A. FLUMERFELT     2,636,758
NESTED BALL SEAT UNIVERSAL JOINT
Filed March 11, 1950
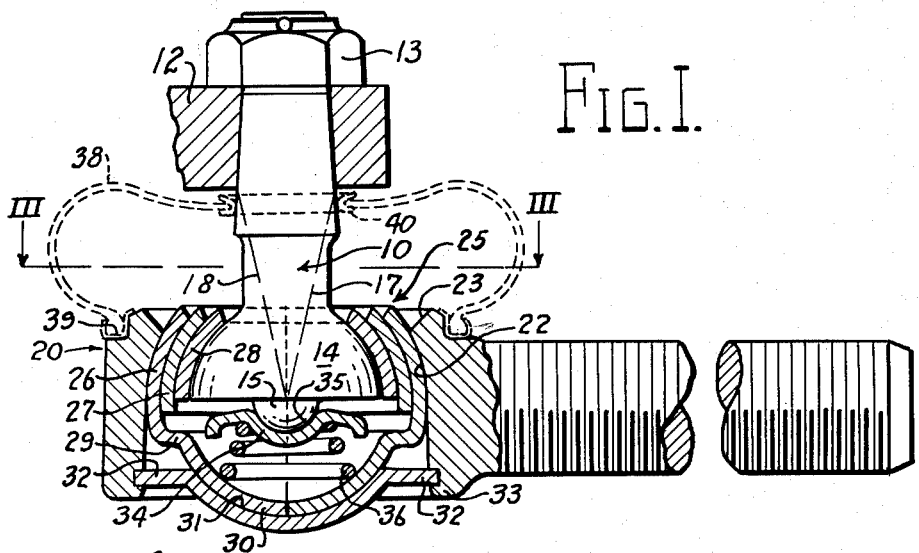
Fig. I.
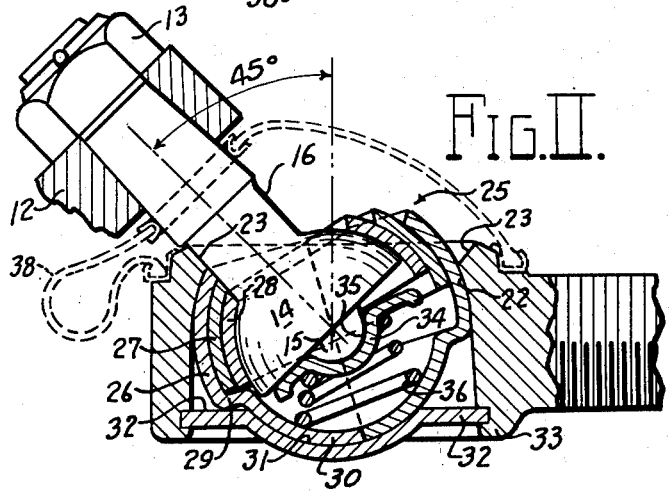
Fig. II.
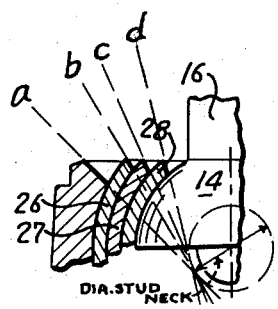
Fig. IV.
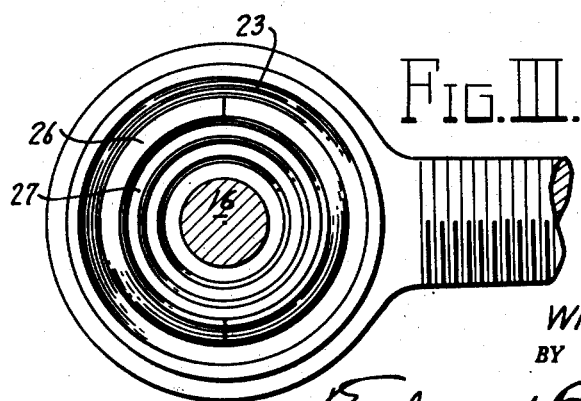
Fig. III.
INVENTOR.
William A. Flumerfelt
BY
Edmund B. Whitcomb
ATTORNEY Patented Apr. 28, 1953

2,636,758

UNITED STATES PATENT OFFICE 2,636,758

NESTED BALL SEAT UNIVERSAL JOINT

William A. Flumerfelt, Columbus, Ohio, assignor to The Columbus Auto Parts Company, Columbus, Ohio, a corporation of Ohio Application March 11, 1950, Serial No. 149,107

6 Claims. (Cl. 287—90)

This invention relates to universal joints and has for its object to provide a novel construction and assembly in a universal joint particularly adapted for use in automobile steering mechanisms in which a unique type of seating arrangement is provided in combination with a ball and ball stud and housing, whereby greatly extended bearing or working surfaces between the parts of the joints are provided and a very wide angle of oscillation is permitted without reducing the strength of the joint and still maintaining a high factor of safety against the possibility of the joint pulling apart in use.

A further object of the present invention is to greatly increase the length of life of the joint in addition to obtaining an extremely wide angle of oscillation referred to by providing such greatly increased wearing surfaces between the several seats and less wear between the seats and the housing and stud.

A further object of the present invention includes the provision in the joint of the character described of a plurality of relatively thin ball seat units in which an excellent take-up to compensate for wear is provided, permitting unhampered oscillatory and rotary motion of the ball and stud relative to the housing in steering linkage universal joints and other assemblies.

This application is a continuation-in-part of my prior copending applications, Serial No. 25,745 filed May 7, 1948 and application Serial No. 43,133 filed August 7, 1948, now Patent No. 2,576,830.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure I is a vertical sectional view of my improved construction, parts being shown in elevation, the stud being shown in normal position at right angles to the housing extension;

Figure II is a similar vertical sectional view with parts in elevation with the stud shown in one of its extreme positions of oscillation;

Figure III is a section taken along the line III—III of Figure I; and

Figure IV is a diagrammatic sectional view showing the correlation of the parts.

Referring to Figure I, the ball part stud 10 is adapted to be connected to the steering arm connection 12, the stud 10 being provided with screw threads for receiving the connecting locking nut 13 for securing the stud in place in the steering mechanism. The other end of the stud 10 has a ball part 14 terminating in a centrally arranged smaller spherical extension 15 to form a pivot for the stud. The ball part 14 is connected to the stud 10 by a reduced neck portion 16 of the formation indicated in which the configuration is such as to not detract from the strength of the stud for shear and bending moments. In this connection, it will be noted that the neck portion at no point is of less diameter than indicated by the converging guide lines 17 and 18 which converge from the anchoring of the stud to the center of the ball.

The housing 20 is provided with an internal spherically-shaped bearing surface 22 terminating in a widely flared opening 23 to facilitate wide angles of oscillation, the configuration of said opening 23 being such as to permit the neck 16 of the stud to lie flatwise in contact therewith as indicated in Figure II.

Interposed between the ball part 14 and the spherically-shaped bearing surface 22 in the housing, I have arranged a plurality of nested seats indicated broadly by the reference numeral 25 which in the present instance is composed of three separate relatively thin seat units 26, 27 and 28, the outer pair 26 of which are composed of two half parts, each part having a lower extension 30 of less radius than the main spherically-shaped bearing portion, said extension 30 seating in a depression 31 in the bottom or end closure 32 for the housing 20. It will be noted that the closure 32 is securely held to the housing 20 by a turned-over end 33 on the housing.

Interposed between the lower end of the bearing extensions 30 on the outer seat units 26 and the ball part pivot 15 is a spring assembly and take-up unit comprising a spring seat and bearing member 34 having a well 35 into which the extension 15 of the ball part 14 extends and is seated therein. A helical spring 36 contacts at its upper end on the lower side of the spring retainer and bearing unit 34 and at its lower end on the inside of the two halves of the outermost seat member 26.

The inner seat members 27 and 28 are properly shaped to fit or nest within the outer seat member 26 and these inner seats 27 and 28 may be made in separate half units or in the form of a continuous annulus or one-piece seat member having spherical bearing surfaces both on the inside and outside thereof. The outer seat sections 26 between the spherical main bearing surface and the reduced extension 30 are connected with an integral ledge 29 arranged so that in the extreme position of oscillation of the stud 10 shown in Figure II, the outer surface of said ledge 29 will contact the inner surface of the end plate 32 while the inside surface of the ledge 29 forms a stop for the lower edges of the inner seats 27 and 28 as indicated.

The upper edges of each of the seats as well as the flare 23 on the outlet opening of the housing, as indicated in Figure IV, are all formed on tangents a, b, c and d to a circle struck from the center of the ball part, the diameter of said circle being the same as the neck 16 of the stud 10. This insures the nesting of the seats as indicated in Figure II with the surface of the neck 16 lying in contact with the flare 23 and the top edges of each of the seats 26, 27 and 28, all in alignment flush with each other.

I also provide a flexible dust guard 38 which may be of any desired type capable of flexing sufficiently to provide for a wide angle of oscillation, the dust guard 38 being secured to the housing by clamping means in groove 39 and to the stud 10 by a washer arrangement 40.

In assembly of the universal joint disclosed herein, the nested seats, ball part and ball stud are assembled as a unit with the coil spring 36 inserted in place with the spring retainer 34 in contact with the vertical bearing or pivot 15 on the ball part 14 in axial alignment with the axis of the stud. These elements are then inserted into the housing 20 from the bottom thereof until the outside spherical surface of the outside seat 26 contacts the surface 22 of the housing, whereupon the closure plate 32 is inserted and the lower rim of the housing 33 forced over to hold the plate in place. The upper end of the shank 10 may then be assembled to the steering mechanism parts as indicated.

From the foregoing it will be seen that I have provided a construction capable of an indicated degree of oscillation equal to 45 degrees on both sides of the normal giving a total angle of oscillation of 90 degrees which is an extreme angle of oscillation for universal joints of this type. In this extreme position, from consideration of Figure II, it will be seen that there is such a degree of overlapping of the several seats 26, 27 and 28 as to prevent any possibility of the joint pulling apart and in this connection, since the inner seat may be of a continuous ring or annulus formation the factor of safety in use is thereby increased.

It is apparent that, within the scope of the invention, modifications and different arrangements may be made other than is herein disclosed, and the present disclosure is illustrative merely, the invention comprehending all variations thereof.

What I claim is:

1. In combination, a socket joint having a housing, an integral stud and ball portion having a spherically-shaped bearing surface and a plurality of nested seat and take-up members interposed between said ball portion and said housing, said housing having a cavity therein provided with a spherically-shaped bearing inner wall portion and a flared outlet connected thereto, the outermost of said nested seat members having an outside bearing surface conforming to the inside surface of said spherically-shaped cavity wall; each of said nested seat members having inside and outside spherically-shaped bearing surfaces conforming with adjacent contacting surfaces, the innermost seat member conforming to said ball portion; and the upper edges of each of said nested seat members terminating on a flare, the flared end plane of each seat member located at a tangent to a sphere concentric with said ball portion, the diameter of said sphere being equal to the diameter of the neck of the stud; in normal position, the inner edge of the flared end of the innermost seat member terminating below the line of connection between the ball portion and the neck and the inner edge of the flared end of each successive seat member terminating on the outside surface of the next adjacent innermost seat member below the outside edge of the flared end thereof; said stud having a cutaway portion forming a neck between the ball portion and said stud; means closing the other end of said housing; and expandable spring and take-up means interacting between said end closing means and said ball portion and said nested seat members.

2. In combination, a socket joint having a housing, an integral stud and ball portion having a spherically-shaped bearing surface and a plurality of nested seat and take-up members interposed between said ball portion and said housing, said housing having a cavity therein provided with a spherically-shaped portion and a flared open ended outlet connected to said spherically-shaped portion, the outermost of said nested seat members having an outside main bearing surface conforming to the inside surface of said spherically-shaped cavity wall; each of said nested seat members having inside and outside spherically-shaped bearing surfaces conforming with adjacent contacting surfaces with the innermost seat member conforming to the spherical bearing surface of the ball portion of said stud; means closing the other end of said housing; a pivotal bearing in said end closing means; the outermost seat member having an end extension located axially in respect to the stud in normal position, said extension forming a pivotal bearing surface fitting in said end bearing, the upper edges of each of said nested seat members terminating on a flare, the flared end plane of each seat member located at a tangent to a sphere concentric with said ball portion, the diameter of said sphere being equal to the diameter of the neck of the stud; in normal position, the inner edge of the flared end of the innermost seat member terminating below the line of connection between the ball portion and the neck and the inner edge of the flared end of each successive seat terminating on the outside surface of the next adjacent innermost seat member below the outside edge of the flared end thereof; and expandable spring means interacting between said ball portion and said closed end.

3. In combination, a socket joint having a housing, an integral stud and ball portion having a spherically-shaped bearing surface and a plurality of nested seat and take-up members interposed between said ball portion and said housing, said housing having a cavity therein provided with a spherically-shaped portion and a flared open ended outlet connected to said spherically-shaped portion, the outermost of said nested members comprising a pair of integral one-piece seats each having an outside main bearing surface conforming to the inside surface of said spherically-shaped cavity wall; each of said nested seats having inside and outside spherically-shaped bearing surfaces conforming with adjacent contacting surfaces with the innermost seat conforming to the spherical bearing surface of the ball portion of said stud; means closing the other end of said housing; a pivotal bearing in said end closing means; each seat of said outermost pair having a reduced spherically-shaped extension of smaller radius than the main bearing thereof, said extensions fitting in said pivotal bearing, the main bearing portion of each of said pairs of outermost seats being connected with the end bearing portion thereof, the inside surface of said connection forming stop means for the inner edges of the other of said nested seat members and the outside surface of said connection arranged to contact said end closing means in the extreme position of oscillation of the stud relative to the housing; and expandable spring and take-up means interacting between said end closing means and said ball portion and nested seat members to compensate for wear.

4. In combination, a socket joint having a housing, an integral stud and ball portion having a spherically-shaped bearing surface, said stud having a reduced neck portion adjacent the ball portion; a plurality of nested seat and take-up members interposed between said ball portion and said housing, said housing having a cavity therein provided with a spherically-shaped portion, a flared open end outlet connected to said spherically-shaped portion and a closed end at the opposite end of said housing, the outermost of said nested seat members having an outside bearing surface conforming to the inside surface of said spherically-shaped cavity wall; each of said nested seat members having inside and outside spherically-shaped bearing surfaces conforming with adjacent contacting surfaces with the innermost seat member conforming to the spherical bearing surface of the ball portion of said stud; means closing the other end of said housing; a pivotal bearing in said end closing means; the outermost seat member having a reduced extension located axially in respect to the stud in normal position, said extension fitting in said end bearing, said outermost seat member having an inwardly extending ledge between said outside bearing surface and said reduced extension, the inside surface of said ledge forming a stop for the inner edges of the other of said nested seat members and the outside surface of said ledge arranged to contact said closing means in the extreme position of oscillation of the stud relative to the housing; the outlet opening of said housing, the upper edges of each of said nested seat members, and the outside surface of the reduced neck portion of said stud being arranged at a tangent to a sphere concentric with said ball portion, the diameter of said sphere being equal to the diameter of the neck portion of the stud, the neck portion on said stud being arranged to simultaneously contact in alignment the flared outlet of said housing and the outer edges of each of said nested seat members when said stud is in said extreme position of oscillation; and expandable spring and take-up means interposed between said ball portion and said closed end.

5. In combination, a ball and socket joint having a housing, an integral stud and ball portion having a spherically-shaped bearing surface; a plurality of separate metallic nested seat and take-up members interposed between said ball portion and said housing, said housing having a cavity therein provided with a spherically-shaped inner wall bearing portion and an outlet connected thereto, each of said metallic seat members being freely rotatable and slideable with respect to each other and to said ball portion and said bearing wall in said housing, the outermost of said nested seat members having an outside bearing surface conforming to the inside surface of said spherically-shaped cavity wall; said nested seat members having inside and outside spherically-shaped bearing surfaces conforming to and located in contact with adjacent bearing surfaces, the innermost seat member conforming to said ball portion; closure means for the other end of said housing; and expandable spring means positioned within said ball and socket joint, said housing, seat members and closure forming means whereby said spring maintains said ball part, seat members and the inner bearing portions of said housing in substantially constant operative contact.

6. In combination, a ball and socket joint having a housing, an integral stud and ball portion having a spherically-shaped bearing surface; a plurality of separate metallic nested seat and take-up members interposed between said ball portion and said housing, each take-up member comprising a pair of similarly shaped complementary sections, the adjacent edges of each complementary section being substantially along a plane passing through the axis of the stud in its normal position, said housing having a cavity therein provided with a spherically-shaped inner wall bearing portion and an outlet connected thereto, each of said metallic seat members being freely rotatable and slideable with respect to each other and to said ball portion and said bearing wall in said housing, the outermost of said nested seat members having an outside bearing surface conforming to the inside surface of said spherically-shaped cavity wall; said nested seat members having inside and outside spherically-shaped bearing surfaces conforming to and located in contact with adjacent bearing surfaces, the innermost seat member conforming to said ball portion of said ball part; closure means for the other end of said housing; and expandable spring means positioned within said ball and socket joint, said housing, seat members and closure forming means whereby said spring maintains said ball part, seat members and the inner bearing portions of said housing in substantially constant operative contact.

WILLIAM A. FLUMERFELT.

References Cited in the file of this patent

UNITED STATES PATENTS

| Number | Name | Date |
| --- | --- | --- |
| 1,868,818 | Eksergian | July 26, 1932 |
| 2,205,981 | Klages | June 25, 1940 |
| 2,271,293 | Flumerfelt | Jan. 27, 1942 |